United States Patent [19]

Bertram et al.

[11] Patent Number: 4,714,851
[45] Date of Patent: Dec. 22, 1987

[54] SINGLE-PHASE SYNCHRONOUS MOTOR COMPRISING A TWO-POLE PERMANENT-MAGNET ROTOR

[75] Inventors: Leo Bertram, Stolberg, Fed. Rep. of Germany; Hugo Schemmann, Schaesberg, Netherlands

[73] Assignee: U.S. Philips Corporation, New York, N.Y.

[21] Appl. No.: 866,034

[22] Filed: May 21, 1986

[30] Foreign Application Priority Data

May 24, 1985 [DE] Fed. Rep. of Germany ....... 3518694

[51] Int. Cl.[4] ............................................. H02K 21/12
[52] U.S. Cl. ..................................... 310/156; 310/162; 310/261
[58] Field of Search ............... 310/152, 162, 156, 154, 310/261, 49

[56] References Cited

U.S. PATENT DOCUMENTS

| 2,418,980 | 4/1947 | Morrill | 310/156 |
| 2,566,618 | 9/1951 | Lindsey | 310/156 UX |
| 3,638,056 | 1/1972 | Imvis | 310/261 |
| 4,535,263 | 8/1985 | Avery | 310/156 X |

*Primary Examiner*—Donovan F. Duggan
*Attorney, Agent, or Firm*—F. Brice Faller

[57] ABSTRACT

A single-phase synchronous motor comprises a two-pole permanent-magnet rotor (5) between two electromagnetically excited stator coils (9). At the location of the median plane (33) parallel to the direction of magnetization (37) parallel to the direction of the permanent-magnet rotor (5) has a shape which deviates from a cylindrical shape and the dimension of the permanent-magnet rotor (5) in the direction of magnetization (37) is largest near the median plane (33).

8 Claims, 3 Drawing Figures

SINGLE-PHASE SYNCHRONOUS MOTOR COMPRISING A TWO-POLE PERMANENT-MAGNET ROTOR

BACKGROUND OF THE INVENTION

The invention relates to a single-phase synchronous motor comprising a two-pole permanent-magnet rotor between two electromagnetically excited stator coils.

A single-phase synchronous motor with a permanent-magnet rotor is known from the magazine ETZ, Vol. 30, 1978, No. 2, pages 56 to 60 and DE-OS No. 32 15 376. This cylindrical permanent-magnet rotor is magnetised in diametrally parallel directions. The magnetizing coils are arranged on the U-shaped stator iron. Between the stator poles a two-pole stator field is formed. The inner field lines in the rotor of this motor are curved in such a way that poles with a high field density are formed, the two opposite pole faces each being limited to an angle of the order of magnitude of 65° on the rotor periphery. This results in concentrated magnet poles which urge the rotor towards the smallest air gap between the rotor and the asymmetric stator.

For reasons of economy it may be favourable to arrange mutually spaced permanent-magnet bodies on a symmetrical iron core (article by Mr. Karl Ruschmeyer, "Motoren und Generatoren mit Dauermagneten", Vol. 123, Kontakte und Studium, edited by Prof. Dr. Ing. Wilfried J. Bartz, Expert-Verlag, 1983, pages 36 and 37). The known single-phase synchronous motors described in ETZ, Vol. 30 must comply with a specific requirement in order to obtain self-starting. This requirement is that when the motor is switched off the rotor is rotated in a specific position relative to the stator poles. This is achieved by means of the "detent torque". In addition, an angle of asymmetry must be defined, which is an angle between the orientation of the rotor field and the stator field when the motor is stationary and which is dictated by the motor construction.

From DE-AS No. 12 61 235 it is known to construct the rotor of a low-power synchronous motor from two permanent-magnetic elements between which a thin sheet is interposed. This rotor has cylindrical peripheral portions and is flattened at the location of the thin sheet. A single-phase synchronous motor with such a cylindrical construction has a poor starting behaviour because the angle of a symmetry which can be obtained with this cylindrical construction is comparatively small.

SUMMARY OF THE INVENTION

It is the object of the invention to increase the angle of asymmetry so that for the associated load larger.

In accordance with the invention this object is At the location of the median planes parallel to the direction of magnetization the peripheral surface of the permanent-magnet rotor has a shape which deviates from a cylindrical shape and the dimension of the permanent-magnet rotor in the direction of magnetization is largest near the median plane.

A motor which is thus constructed is capable of starting despite a larger friction of the load coupled to it.

In an embodiment of the invention the peripheral surface is inclined symmetrically relative to the median plane so that it is peaked at the location of the permanent magnets. Such a peaked shape of the peripheral surface can be manufactured simply.

In a further embodiment of the invention the peaked shape of the peripheral surface at the location of the permanent magnets is approximated by superposing blocks of a hard-magnetic material. This also results in a simplified manufacture.

DETAILED DESCRIPTION OF THE PREFERRED EMBODIMENT

Figure 1:
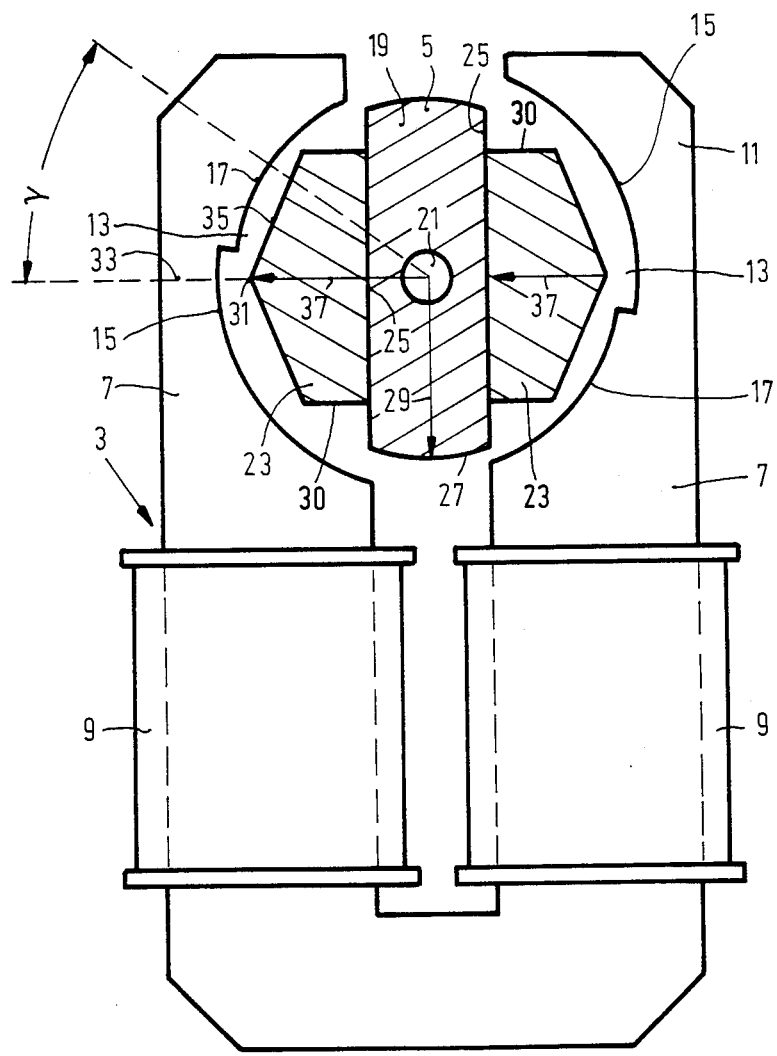
FIG. 1 shows a single-phase synchronous motor comprising a rotor formed laminating soft-magnetic and hard-magnetic materials.

The single-phase synchronous motor shown in FIG. 1 comprises a U-shaped stator iron 3, a rotor 5 and exciter coils 9 arranged on the limbs 7 of the stator iron 3. At the ends 11 of the limbs the stator iron has arcuate poles 13 between which the rotor 5 rotates. The poles 13 comprise pole arc portions 15 and 17 of large and small diameter, respectively. The large diameter arc portions 15 are diametrically opposed, and the small diameter arc portions 17 are likewise diametrically opposed.

In the present example the rotor 5 comprises a soft-magnetic block-shaped central part 19 through which the rotor shaft 21 extends. On opposite sides permanent magnets 23 are mounted on the soft-magnetic central part 19, preferably by means of an adhesive. The interfaces 25 between the soft-magnetic central part 19 and the magnets 23 extend parallel to one another.

The permanent magnets on each side of the central part 19 recede along the interfaces 25. Consequently, the central part 19 of the rotor with peripheral surface 27 having a radius 29 projects from the radially receding surfaces 30 of the rotor. In a direction perpendicular to the interfaces 25 the permanent magnets 23 are peaked at the sides which are remote from the central portion 19. The resulting apex lines 31 are situated in median plane 33 of the rotor where the median plane 33 is a plane in which the axis of rotation lies. The permanent magnet segments 23 are magnetized in the same direction from one peaked surface 35 towards the opposite peaked surface 35, as is indicated by arrows 37.

This rotor construction results in a field concentration in the direction of the median plane 33. During no-load operation the detent torque causes the rotor 5 to rotate automatically towards median plane 39 through an angle $\gamma$.

Figure 3:
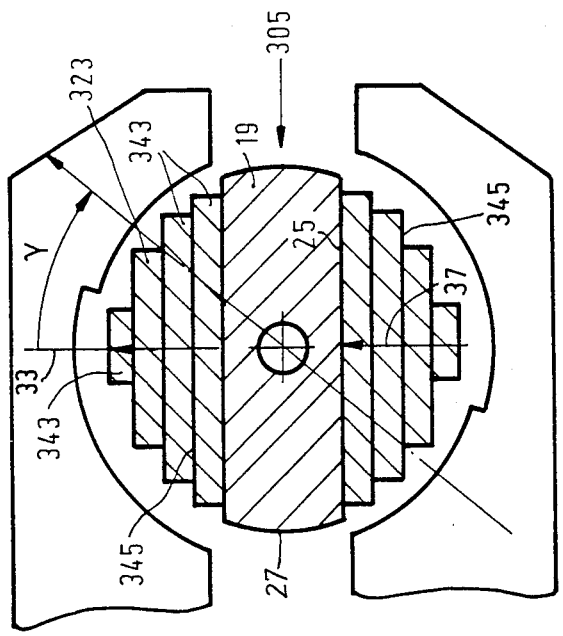
FIGS. 2 and 3 show modified versions of the laminated rotor comprising superposed magnet segments.
Figure 2:
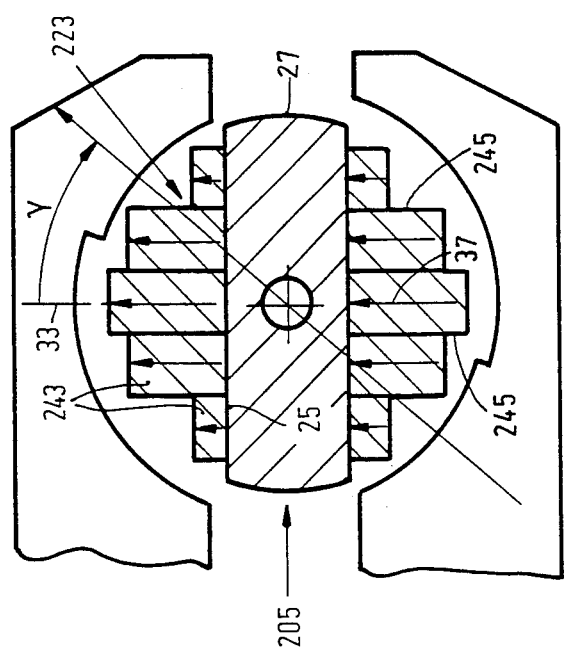

FIGS. 2 and 3 show rotors 205 and 305 which again comprise a soft-magnetic central part 27, as in FIG. 1. The permanent magnets 223 and 323, however, are constructed differently. In FIG. 2 they comprise flat or bar-shaped magnets 243 whose height in a direction perpendicular to the interfaces 25 increases from the peripheral surface 27 of the central part up to the median plane 33, after which it decreases again. This construction is obtained if the magnets 243, which are magnetized perpendicularly to the central part 19 and the interfaces 25, adjoin each other along surfaces 245 which extend perpendicularly to the interfaces 25. The construction of the rotor shown in FIG. 3 differs from that shown in FIG. 2 in that the magnets 343 are superposed along surfaces 345 which extend parallel to the interfaces 25. In this case the longitudinal dimensions of the magnets 343 decrease from magnet to magnet starting from the central part 19. In the rotors shown in FIGS. 2 and 3 the magnetisation is also perpendicular to the interfaces 25.

In all the three embodiments the shape of the peripheral surface of the rotor deviates from a cylindrical shape at the location of the median plane. The dimension is largest in the direction of magnetization parallel to the median plane 33 near this plane.

What is claimed is:

1. A single phase synchronous motor comprising
   a stator having two arcuate poles, each pole having an arc portion of large diameter and an arc portion of small diameter, said arc portions of large diameter being diametrically opposed, said arc portions of small diameter being diametrically opposed,
   a two-pole permanent magnet rotor between the poles of said stator, said rotor having median plane in which the axis of rotation lies, the direction of magnetization of said rotor being parallel to said median plane, the peripheral surface of the rotor having a shape which deviates from a cylindrical shape, the dimension of the rotor in the direction of magnetization being largest near the median plane.

2. A single-phase synchronous motor as claimed in claim 1, characterized in that the rotor (5) comprises a soft-magnetic block-shaped central part (19) which is diametrically symmetrical relative to the rotor axis and which comprises two opposite lateral surfaces (22) on which permanent magnets (23) are arranged whose direction of magnetization extends perpendicularly to said surfaces (22).

3. A single phase synchronous motor as in claim 1 wherein each permanent magnet pole of the rotor has a peripheral surface which is inclined symmetrically relative to the median plane, whereby each pole is peaked on the median plane.

4. A single-phase synchronous motor as claimed in claim 3, characterized in that the rotor (5) comprises a soft-magnetic block-shaped central part (19) which is diametrically symmetrical relative to the rotor axis and which comprises two opposite lateral surfaces (22) on which permanent magnets (23) are arranged whose direction of magnetization extends perpendicularly to said surfaces (22).

5. A single phase synchronous motor as in claim 3 wherein each permanent magnet pole comprises a plurality of juxtaposed blocks of hard-magnetic material.

6. A single-phase synchronous motor as claimed in claim 5, characterized in that the rotor (5) comprises a soft-magnetic block-shaped central part (19) which is diametrically symmetrical relative to the rotor axis and which comprises two opposite lateral surfaces (22) on which permanent magnets (23) are arranged whose direction of magnetization extends perpendicularly to said surfaces (22).

7. A single phase synchronous motor as in claim 6 wherein said blocks of hard magnetic material in each pole are juxtaposed along surfaces which extend parallel to the lateral surfaces of the soft magnetic central part.

8. A single phase synchronous motor as in claim 6 wherein said blocks of hard magnetic material in each pole are juxtaposed along surfaces which extend perpendicular to the lateral surface of the soft magnetic central part.

* * * * *